United States Patent [19]
Mathis et al.

[11] Patent Number: 6,011,336
[45] Date of Patent: Jan. 4, 2000

[54] COST-EFFICIENT VIBRATION-ISOLATING MOUNTING FOR MOTORS

[75] Inventors: Cleo D. Mathis, Hacienda Heights; Arturo S. Reynoso, Azusa, both of Calif.

[73] Assignee: VICO Products Mfg. Co., Inc., South El Monte, Calif.

[21] Appl. No.: 09/270,207

[22] Filed: Mar. 15, 1999

Related U.S. Application Data

[60] Provisional application No. 60/078,058, Mar. 16, 1998.

[51] Int. Cl.[7] .............................. H02K 5/04; H02K 5/24; B08B 3/02
[52] U.S. Cl. ................................. 310/91; 310/51; 4/584; 417/363; 248/628
[58] Field of Search ..................................... 417/360, 361, 417/363; 310/51, 91; 4/451.1, 584; 248/671, 674, 628, 637

[56] References Cited

U.S. PATENT DOCUMENTS

| | | | |
|---|---|---|---|
| 2,209,477 | 7/1940 | Reibel | 310/91 |
| 2,982,504 | 5/1961 | Feiertag et al. | 310/91 |
| 3,983,429 | 9/1976 | Allardice | 310/91 |
| 4,138,079 | 2/1979 | Ehret et al. | 248/558 |
| 4,220,880 | 9/1980 | Woodard | 310/91 |
| 5,417,401 | 5/1995 | Thompson et al. | 248/674 |
| 5,515,557 | 5/1996 | Spurlin | 4/541.1 |
| 5,649,812 | 7/1997 | Schoenmeyr et al. | 417/363 |

*Primary Examiner*—Nestor Ramirez
*Assistant Examiner*—Burt Mullins
*Attorney, Agent, or Firm*—Wallace G. Walter

[57] ABSTRACT

A cost-efficient vibration-isolating mounting for motors including a pressed or stamped metal motor mount (12) upon with the motor is mounted and a vibration-isolation pad (14) upon which the motor mount (12) is mounted. A clamp formation (42) at each end of the vibration-isolation pad (14) so that a respective thru-bolt (48) secures the motor mount (12) and the assembled vibration-isolation pad (14) to a supporting floor (16) or wall structure. The vibration-isolation pad (14) includes a set of bumpers (40) at each corner to retain the motor mount (12) in place on the top of the vibration-isolation pad (14).

14 Claims, 5 Drawing Sheets

COST-EFFICIENT VIBRATION-ISOLATING MOUNTING FOR MOTORS

CROSS-REFERENCE TO PROVISIONAL APPLICATION

This application claims the benefit of the filing date of U.S. provisional application 60/078,058 filed by the applicants herein on Mar. 16, 1998.

BACKGROUND OF THE INVENTION

The present invention relates to an improved cost-efficient vibration-isolating mounting for motors and, more particularly, for mounting electric motors and connected pump assemblies as used in the jetted bath and spa industry.

Whirlpool bath and spa-type installations typically include a tub structure having a plurality of water jets for introducing a pressurized stream of water and air into the tub and a suction inlet from which water is withdrawn. The water withdrawn from the tub through the suction inlet is provided to a shaft-driven recirculation pump which pressurizes the water and distributes the pressurized water to the water jets for re-introduction into the tub.

The recirculation pump typically includes a motor driving an impeller-type centrifugal pump through an interconnecting drive shaft. The motor/pump assembly is typically mounted on a portion of the floor structure upon which the tub structure is supported, or, in some case, on an adjacent wall structure. In general, the motor/pump assembly is supported on a stamped metal mounting plate or 'saddle' which, in turn, is connected to the supporting floor structure via a resilient elastomer pad that functions to isolate the vibrations developed by the rotating motor and its driven pump from the floor structure. The elastomer pad was typically molded as a rectangular pad from a silicone-like material with a series of spaced, parallel ribs on one side thereof aligned along the longer axis of the pad and another set of spaced, parallel ribs on the opposite side of the pad aligned along the shorter axis of the pad and orthogonal to the ribs on the opposite side. An elongated bolt-hole was provided adjacent each corner of the elastomer pad with a thin-walled resilient sleeve designed to extend into its respective similarly sized elongated hole in the stamped metal saddle. In order to secure the saddle and the elastomer pad to the floor structure, a bolt was passed through the co-aligned holes of the saddle and the elastomer pad into the floor structure to secure the components to the floor structure. Typically, elastomer disc or washer was mounted between the head of each mounting bolt and the stamped metal saddle to further isolate the vibrational energy from the floor structure.

From the standpoint of installation time and cost, a four-bolt mounting represented a defined labor cost. In view of the competition-driven downward cost pressures in this industry, a mounting system that required less installation time and lower cost would provide a competitive advantage.

SUMMARY OF THE INVENTION

In view of the above, it is an object of the present invention, among others, to provide a cost-efficient vibration-isolating mounting for motors and pumps as used in the jetted bath and spa industry in which the mounting is effected by two-fasteners.

It is another object of the present invention to provide a cost-efficient vibration-isolating mounting for motors and their pumps as used in the jetted bath and spa industry that provides a reduced cost of installation and materials.

The present invention advantageously provides a cost-efficient vibration-isolating mounting for motors including a pressed or stamped metal motor mount upon with the motor is mounted and a vibration isolating pad upon which the motor mount is mounted. A clamp formation at each end of the vibration isolation pad and through which a respective through-bolt passes is used to secure the motor mount and the assembled vibration isolation pad to a supporting floor or wall structure. The vibration isolation pad includes a set of rail-like bumpers at each corner to retain the motor mount in place on the top of the vibration isolation pad.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
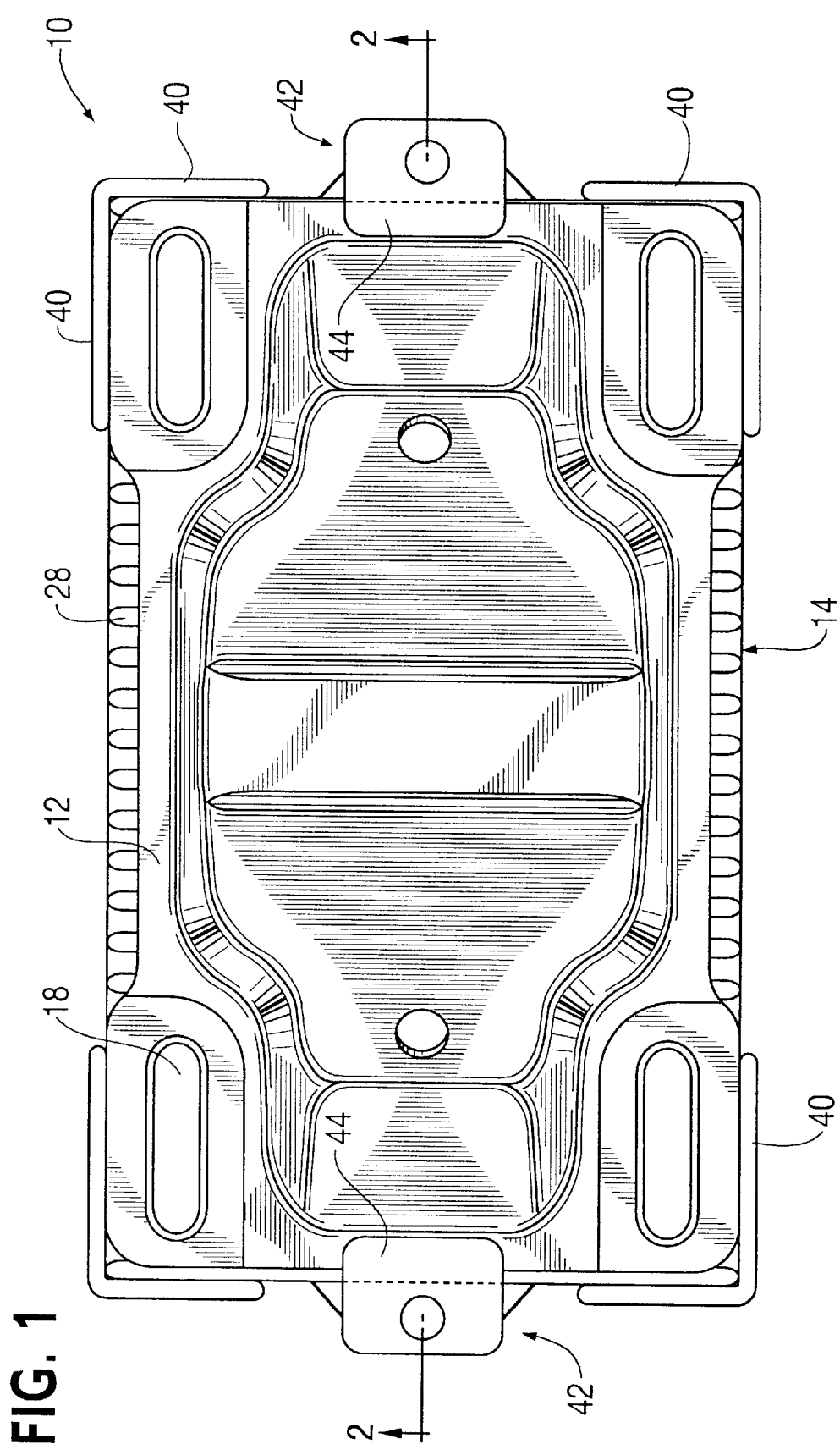
FIG. 1 is a top or plan view of a cost-efficient vibration-isolating mounting for motors in accordance with the present invention.
Figure 2:
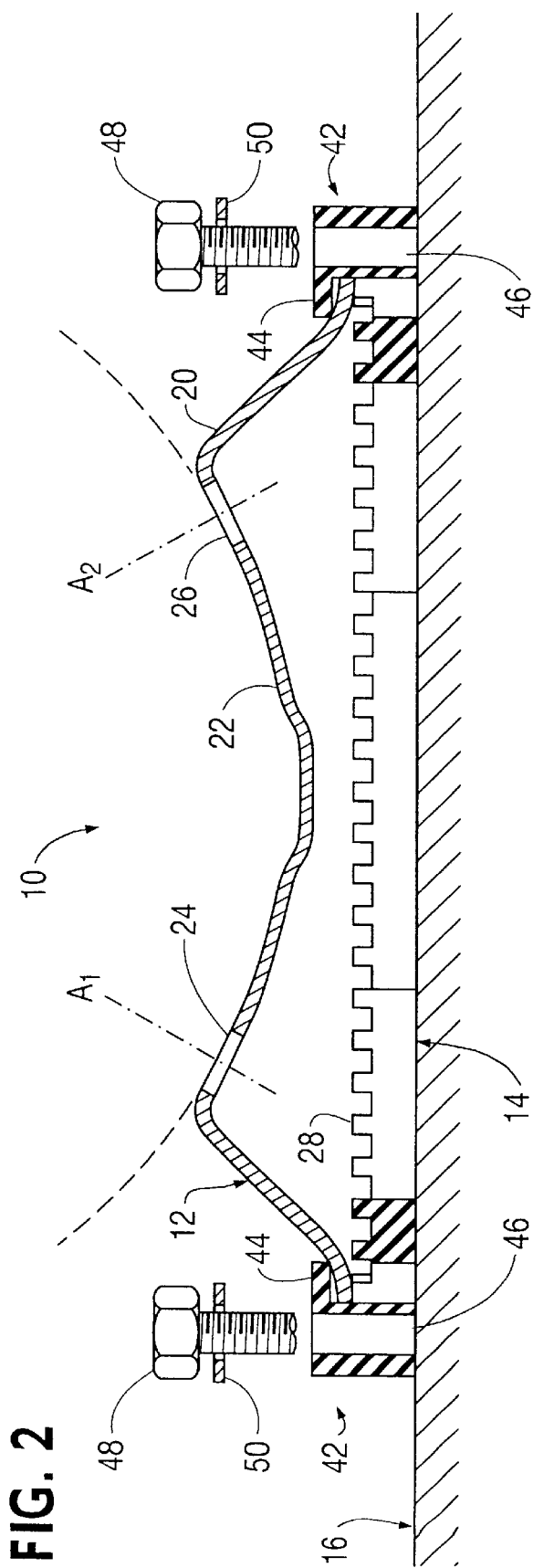
FIG. 2 is a cross-sectional view of the mounting of FIG. 1 taken along line 2—2 of FIG. 1.

A cost-efficient vibration-isolating mounting system for motors in accordance with the present invention is shown in plan view in FIG. 1 and in cross-sectional view in FIG. 2 and designated generally therein by the reference character 10. As shown in these two figures, the mounting system 10 includes a motor mount 12 (typically fabricated from stamped or pressed steel sheet) and a vibration-isolation pad 14. As best shown in FIG. 2, the vibration-isolation pad 14 is interposed between the motor mount 12 and the floor 16, wall, or other structure upon which the motor/pump assembly (not shown) is to be mounted. The vibration-isolation pad 14 is preferably molded as a unitary component from a resilient elastomeric material, such as a silicone.

The motor mount 12 is formed as a pressed steel component and has a generally rectangular shape in planform (FIG. 1) with an elongated or oblong slot 18 (aligned along the longitudinal direction) formed at each of its four corners. The slots 18 are formed in the motor mount 12 and have been historically used for four-bolt mounting of the motor/pump to the supporting floor or other structure using an elastomer vibration-insulating pad having holes corresponding to the slots 18 in the motor mount 12. The motor mount 12 is formed with an upwardly raised support formation 20 (FIG. 2) that includes a semi-cylindrical saddle surface 22 formed at a radius (dotted-line illustration) that corresponds to that of the motor housing (not shown). The motor is held in position on the saddle surface 22 by bolts or other threaded fasteners (not shown) that extend from the underside of the motor mount 12 through holes 24 and 26 into the motor as is known in the art.

Figure 3:
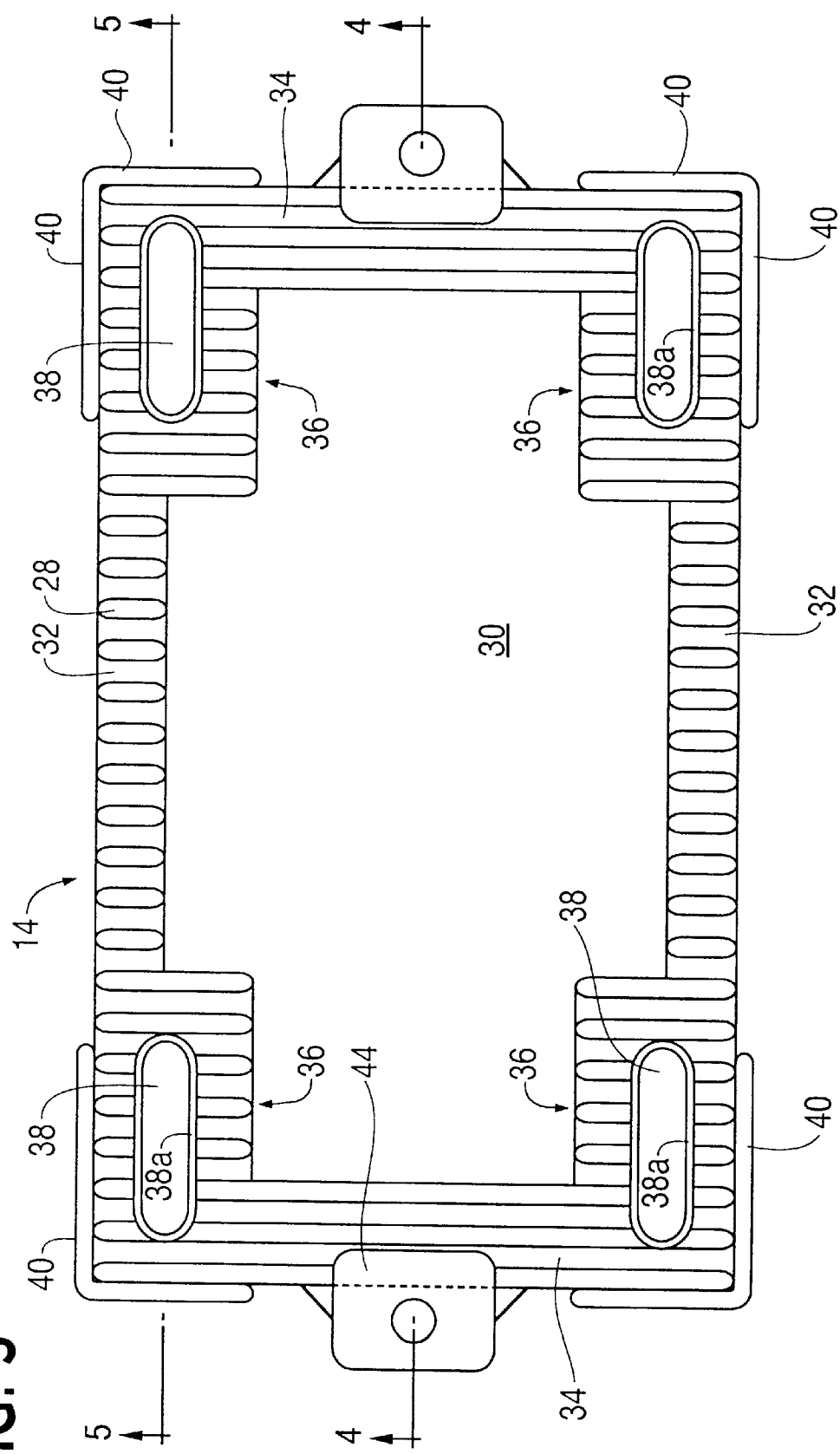
FIG. 3 is a top or plan view of the vibration-isolation pad of the mounting of FIG. 1.
Figure 4:
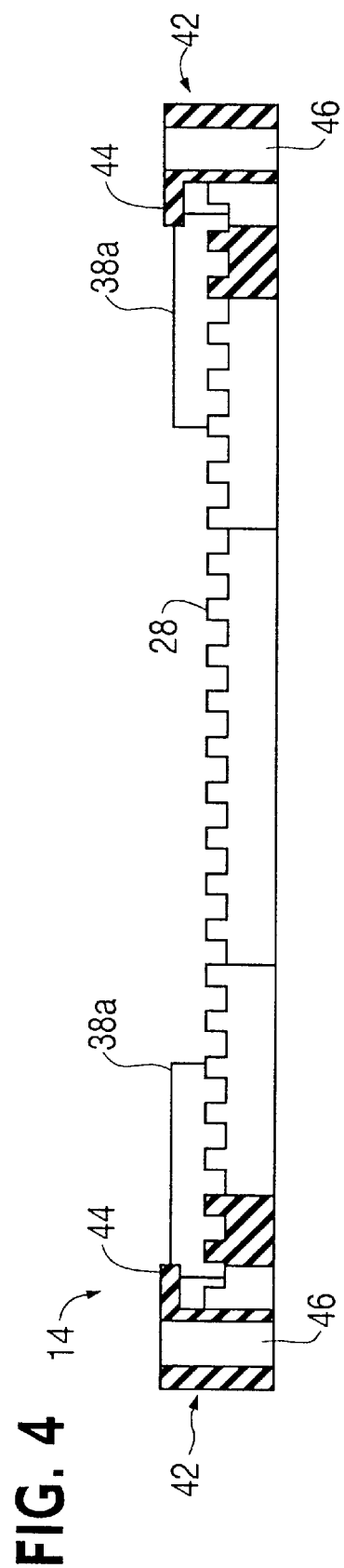
FIG. 4 is a cross-sectional view of the vibration isolation pad of FIG. 3 taken along line 3—3 of FIG. 2.
Figure 5:
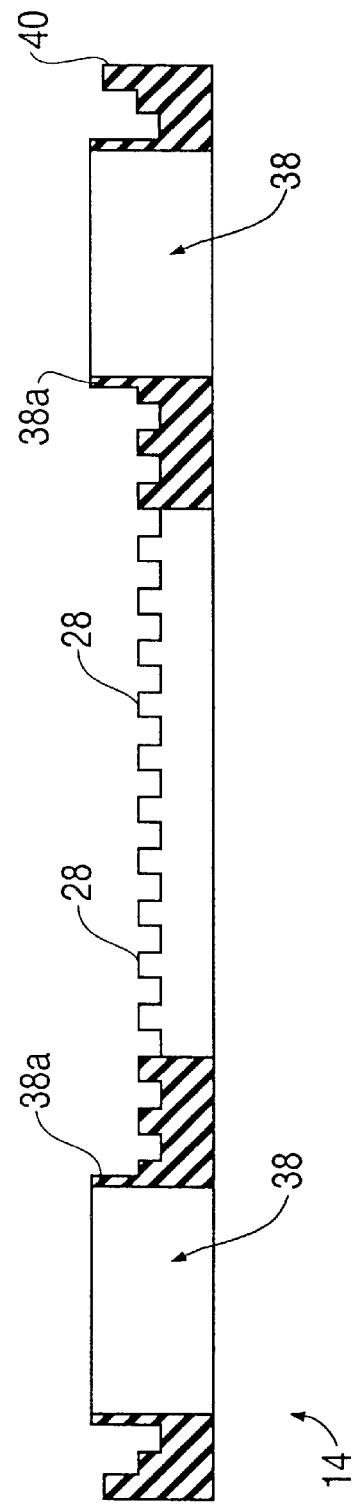
FIG. 5 is a cross-sectional view of the vibration isolation pad of FIG. 3 taken along line 5—5 of FIG. 3.

The motor mount 12 is designed to be seated upon and fitted to the top surface of the vibration-isolation pad 14 (FIG. 3). The vibration-isolation pad 14 is fabricated from a resilient elastomer (such as a silicone) and is designed to absorb some of the vibrational energy of the motor/pump assembly during operation and isolate that vibrational energy from the floor surface. In the preferred embodiment, the vibration-isolation pad 14 is rectangular in shape and has a 6.5 inch dimension in the longitudinal direction and 4.0 inch dimension in the lateral direction and includes a series of spaced-apart ribs 28 that are aligned in the lateral direction and extend a selected distance or elevation above the surface of the vibration-isolation pad 14. While not specifically shown in the figures, the underside of the vibration-isolating 14 (i.e., that side in contact with the floor structure 16) also includes a series of spaced-apart ribs that are aligned in the longitudinal direction of the pad 14 (i.e., orthogonal to the ribs 28 on the opposite side thereof). As shown in FIG. 3, the vibration-isolation pad 14 has an open interior area 30 defined by side portions 32 and end portions 34 with the side portions 32 and the end portions 34 intersecting at pad areas 36 at each corner of the vibration-isolation pad 14. An elongated thru-slot 38 is formed at each corner of the elastomer pad 14. The elongated thru-slots 38 co-align with the elongated slots 18 in the motor mount 12. A thin-walled sleeve 38a (i.e., a 0.110 inch wall thickness) extends upwardly from each of the pad areas 36 (FIG. 5) and has a shape that conforms to the interior dimensions of its corresponding slot 18 in the motor mount 12. When each sleeve 38a is extended through its corresponding elongated slot 18 in the motor mount 12, the sleeve 38a is compressed slightly as it is passed through its slot 18. In the prior art installation arrangement, the motor mount 12 and its vibration-isolation pad 14 were mounted to the support structure (i.e., a floor or wall) by passing a bolt (with an elastomer washer or the combination of a metal back-up washer and an elastomer washer) through the co-aligned slots 18 and 38 to effect a four-bolt securement to the support structure. The elastomeric washer, the thin-wall sleeves 38a, and the underlying pad 14 served to isolate the transmission of unwanted vibrational energy to the support structure.

In accordance with the present invention, the vibration-isolation pad 14 is fitted with corner confinement rails or bumpers 40 that rise above the elevation of the various ribs 28. The elevation of the bumpers 40 above the ribs 28 is at least equal to the thickness of the material from which the motor mount 12 is pressed (i.e., about 0.090 inch in the case of the preferred embodiment). When the motor mount 12 is fitted to the vibration-isolation pad 14, the bumpers 40 are in contiguous contact with or immediately adjacent to the corresponding edges of the motor mount 12 and assist, along with the sleeves 38a, in preventing movement of the motor mount 12 relative to the vibration-isolation pad 14. Thus, the confinement rails or bumpers 40 serve to 'capture' the motor mount 12 on the surface of the elastomer pad 14. In the preferred embodiment each bumper 40 extends about 1.5 inch along the longitudinal edge adjacent its respective corner and about one-inch along the lateral edge adjacent its respective corner.

As best shown in FIGS. 1 and 3, a clamp formation 42 is integrally molded at the opposite lateral ends of the vibration-isolation pad 14 along the medial longitudinal axis. As shown in FIGS. 1 and 2, each clamp formation 42 also includes a tab 44 that extends over a marginal portion of the motor mount 12 and includes a thru-bore 46 through which a thru-bolt 48 and washer 50 are passed to secure the motor mount 12 and the vibration-isolation pad 14 to the floor or other support structure. The tab 44 is spaced above the corresponding surface of the pad 14 to define a recess (unnumbered) that receives an edge portion of the motor mount 12. The tab 44 is spaced above the corresponding surface of the pad 14 by an amount approximately equal to the thickness of the material from which the motor mount 12 is formed (i.e., about 0.090 inch in the case of the preferred embodiment). In the preferred embodiment, the tab 44 is located at the mid-point of the lateral edge and has an overall width in the lateral direction of about one inch. The washer 50 is preferably a rigid (i.e., metal) disc that assists in pressing the tab 44 against the marginal edge of the motor mount 12 and 'sandwiching' the motor mount 12 between the underside of the tab 44 and the corresponding surface of the pad 14. The thru-bolt 48, in most installations, will take the form of a lag bolt; however, other threaded fasteners and securements are well known in the industry.

The vibration-isolating mounting provides a number of advantages of the prior art systems. By using only two fasteners (thru-bolts 48), the system saves installation time and the attendant cost. Because the vibration-isolation pad 14 includes form-fitting bumpers 40 that were not provided as part of the prior art mounting pad, the motor mount 12 is effectively restrained from any relative movement off the top of the vibration-isolation pad 14 and is effectively 'captured' in place by the bumpers 40. Additionally, the end-clamping the motor mount 12 to the top of the vibration-isolation pad 14 through the elastomer tabs 44 of the clamps 42 provides vibration isolation while effecting a secure attachment of the motor mount 12 (and the connected motor/pump) to the support floor, wall, or other mounting structure using only two bolts 48 rather than the four bolts of the prior system. The use two mounting bolts rather than four saves installation time and material costs.

While the system of the present invention optimally used with two mounting bolts, as can be appreciated, the arrangement can be used to effect the traditional four-bolt mounting, or, if the application demands, a six-bolt mounting.

As will be apparent to those skilled in the art, various changes and modifications may be made to the illustrated cost-efficient vibration-isolating mounting for motors of the present invention without departing from the spirit and scope of the invention as determined in the appended claims and their legal equivalent.

What is claimed is:

1. A vibration-isolating mounting for a motor comprising:
   a motor mount (12) upon with the motor is mounted;
   a vibration-isolation pad (14) upon which the motor mount (12) is mounted; and
   a clamp formation (42) at each end of the vibration-isolation pad (14) having through-bores for accepting thru-bolts (48) to secure the motor mount (12) and the assembled vibration-isolation pad (14) to a supporting floor or wall structure.

2. The vibration-isolating mounting of claim 1, wherein said motor mount (12) is fabricated from a sheet material have a selected thickness.

3. The vibration-isolating mounting of claim 1, wherein said clamp formation and said vibration-isolating pad are integrally formed from a resilient elastomeric material.

4. The vibration-isolating mounting of claim 1, further comprising:
   a set of bumpers (40) at each corner of the vibration-isolation pad (14) to retain the motor mount (12) in place on the top of the vibration-isolation pad (14).

5. The vibration-isolating mounting of claim 4, wherein said bumpers (40) extend above the surface of the vibration-isolation pad (14) a distance at least equal to the thickness of the sheet material from which the motor mount is formed.

6. The vibration-isolating mounting of claim 1, wherein said clamp formation (42) further includes an elastomer tab (44) spaced above the surface of the pad (14) to form a recess for receiving an edge portion of the motor mount (12).

7. The vibration-isolating mounting of claim 6, wherein said tab (44) extends above the surface of the vibration-isolation pad a distance at least equal to the thickness of the sheet material from which the motor mount is formed.

8. A vibration-isolating mounting for a motor comprising:

a motor mount (12) upon with the motor is mounted;

a vibration-isolation pad (14) upon which the motor mount (12) is mounted;

a set of confinement rails (40) at each corner of the vibration-isolation pad (14) to retain the motor mount 12 in place on the top of the vibration-isolation pad (14); and means for securing the motor mount (12) and the vibration-isolating pad (14) to a mounting structure using two threaded fasteners.

9. The vibration-isolating mounting of claim 8, wherein said clamp formation and said vibration-isolating pad are integrally formed from an elastomeric material.

10. The vibration-isolating mounting of claim 8, wherein said means for securing comprises:

a clamp formation (42) at opposite ends of the vibration-isolation pad (14), each clamp formation (42) having through-bores (46) for accepting thru-bolts (48) to secure the motor mount (12) and the assembled vibration-isolation pad (14) to a supporting floor or wall structure.

11. The vibration-isolating mounting of claim 10, wherein said clamp formation further includes an elastomer tab (44) spaced above the surface of the pad (14) to form a recess for receiving an edge portion of the motor mount (12).

12. The vibration-isolating mounting of claim 10, wherein said tabs (44) extend above the surface of the vibration-isolation pad (14) a distance at least equal to the thickness of the sheet material from which the motor mount (12) is formed.

13. The vibration-isolating mounting of claim 10, wherein said motor mount (12) is fabricated from a sheet material have a selected thickness.

14. The vibration-isolating mounting of claim 13, wherein said bumpers (40) extend above the surface of the vibration-isolation pad a distance at least equal to the thickness of the sheet material from which the motor mount (12) is formed.

* * * * *